United States Patent [19]

Wagner

[11] Patent Number: 4,973,407
[45] Date of Patent: Nov. 27, 1990

[54] FILTER FOR FILTERING LIQUIDS

[75] Inventor: Jürgen Wagner, Reutlingen, Fed. Rep. of Germany

[73] Assignee: Dipl.-Ing. Erich Fetzer GmbH & Co., Reutlingen, Fed. Rep. of Germany

[21] Appl. No.: 316,651

[22] Filed: Feb. 28, 1989

[30] Foreign Application Priority Data

Mar. 1, 1988 [DE] Fed. Rep. of Germany ....... 3806494

[51] Int. Cl.5 .......................................... B01D 33/044
[52] U.S. Cl. .................................... 210/387; 210/391; 210/396; 210/401; 210/406; 209/411; 384/416
[58] Field of Search ............... 210/386, 387, 396, 398, 210/400-403, DIG. 3, 406, 391; 209/406, 411; 384/416, 418, 419, 439, 441, 152

[56] References Cited

U.S. PATENT DOCUMENTS

| 3,000,507 | 9/1961 | Young | 210/402 |
| 3,915,859 | 10/1975 | Sundin et al. | 210/401 |
| 4,057,437 | 11/1977 | Kracklauer | 210/401 |
| 4,233,157 | 11/1980 | Miller | 210/387 |
| 4,681,679 | 7/1987 | Reber | 210/387 |
| 4,686,042 | 8/1987 | Eckardt | 210/396 |
| 4,724,077 | 2/1988 | Uchiyama | 210/403 |
| 4,826,596 | 5/1989 | Hirs | 210/387 |

FOREIGN PATENT DOCUMENTS 8408211 2/1986 Fed. Rep. of Germany .

Primary Examiner—W. Gary Jones
Assistant Examiner—Matthew O. Savage
Attorney, Agent, or Firm—Bachman & LaPointe

[57] ABSTRACT

A filter for filtering liquids is proposed, in which the filter fabric along an arcuate path is mounted on a bearing element concomitantly rotating with the filter fabric. The bearing element is constituted by a rotatably mounted ring, which is mounted on a bearing inner ring connected to a wall of the filter. The seal between the bearing inner ring and the rotatably mounted ring is provided by an O-ring, which forms a radial or axial seal. In the case of the present filter, the inlet port is located in the rigid wall and its position and shape can be adapted to the particular requirements.

14 Claims, 5 Drawing Sheets

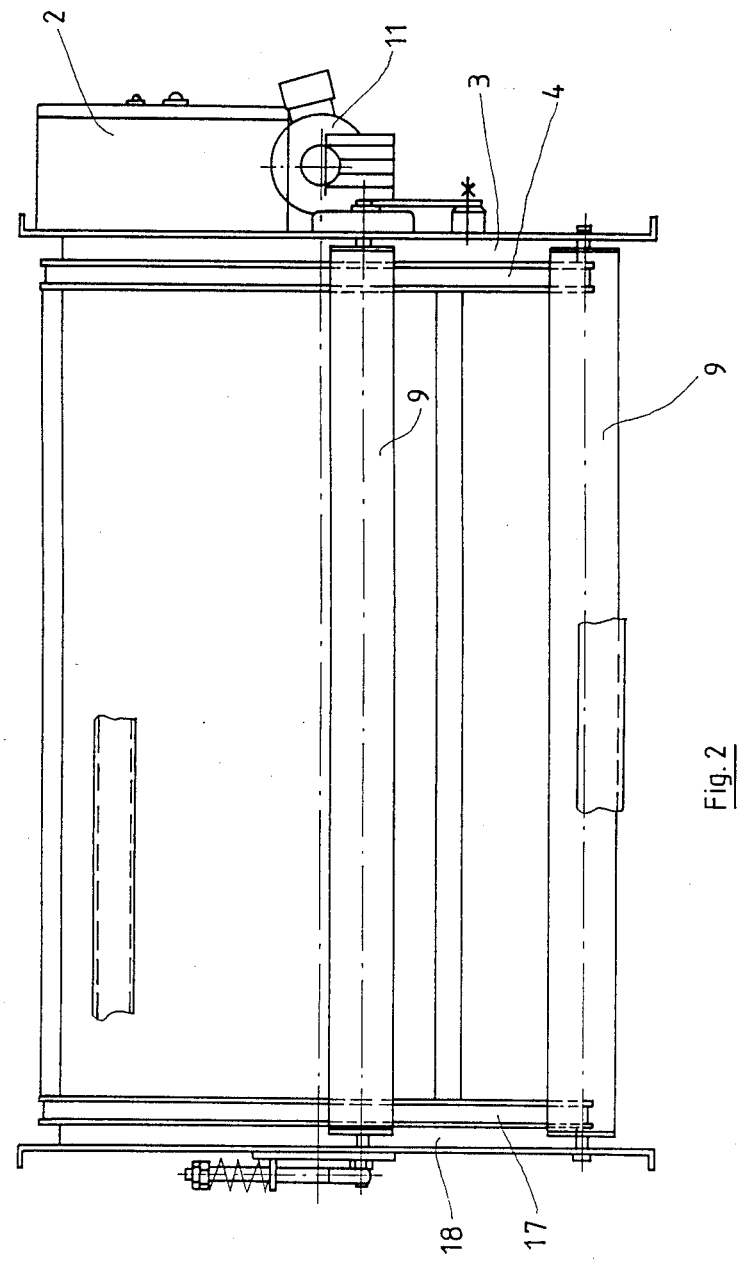

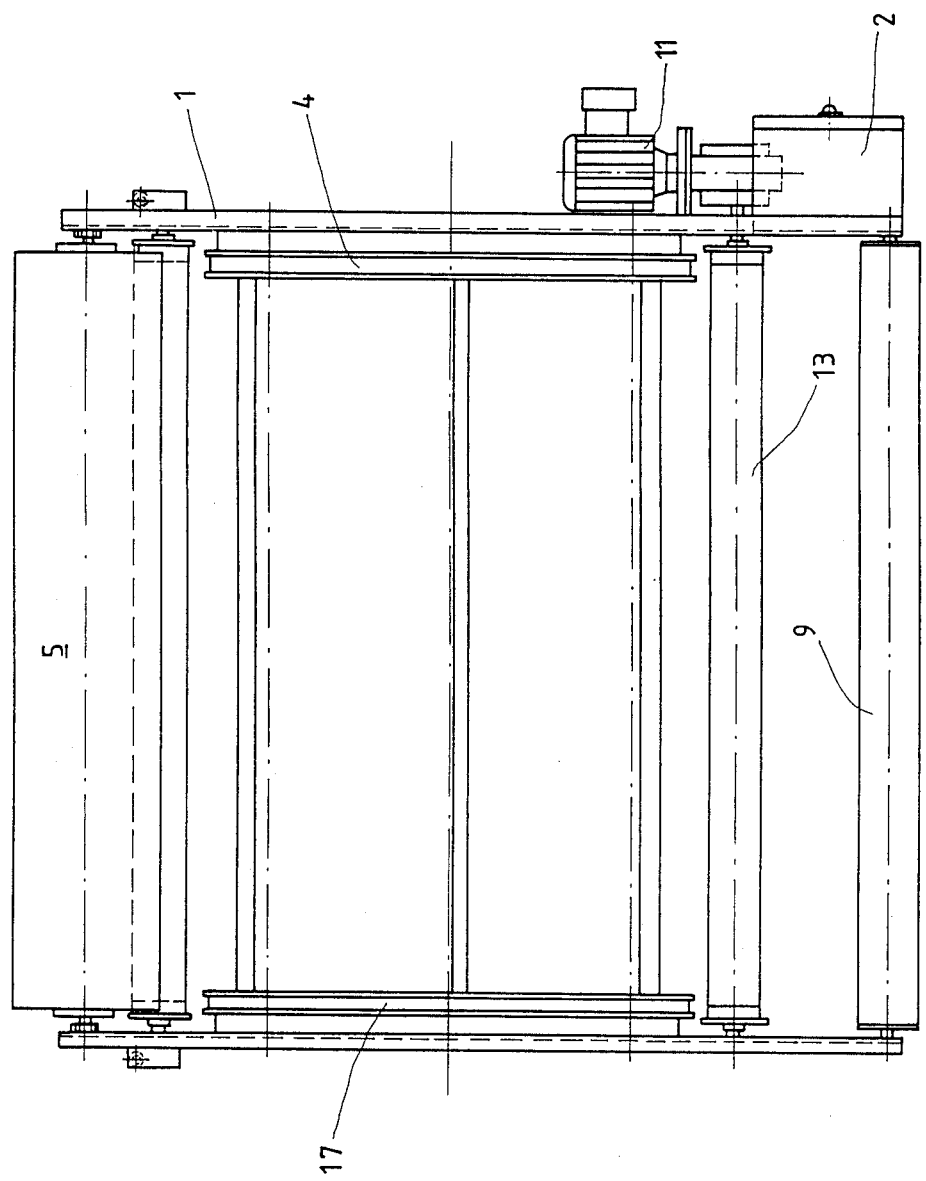

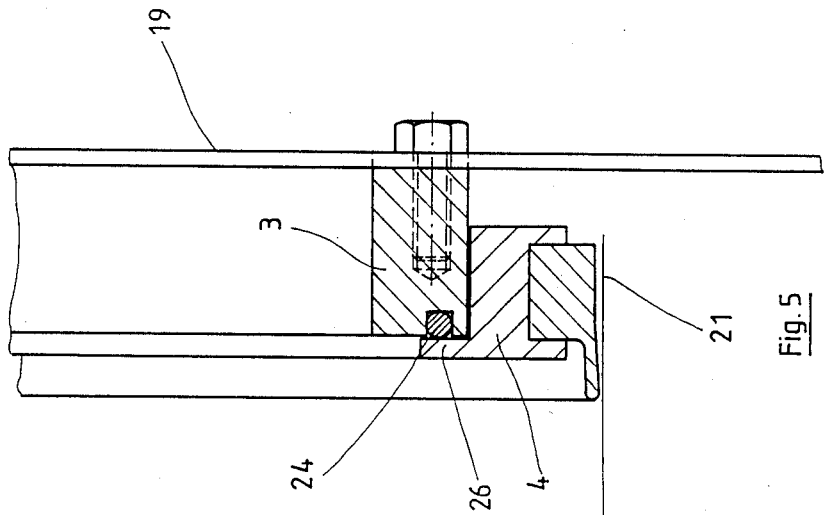
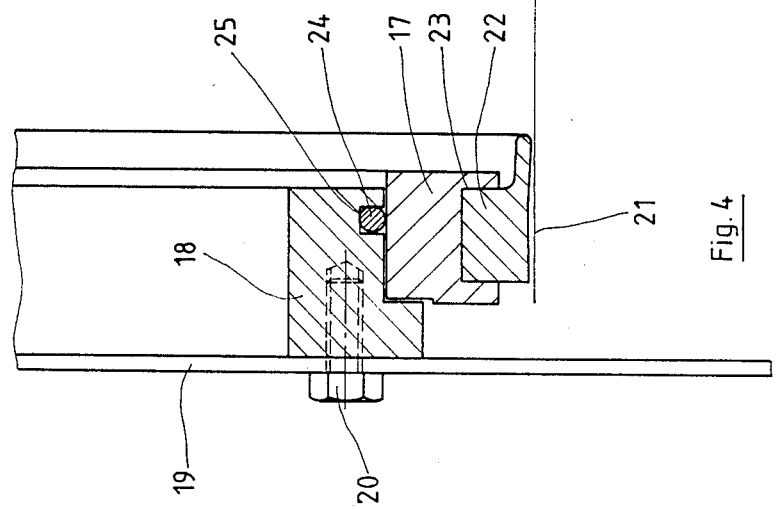

FILTER FOR FILTERING LIQUIDS

The invention relates to a filter for filtering liquids with a filter fabric.

BACKGROUND OF THE INVENTION

German utility model 84 08 211 discloses a filter, in which the liquid to be filtered is passed axially via a hollow shaft into the filtering area, which is bounded by rings or washers and a filter fabric or cloth passed over an arcuate path. The rings are connected to the hollow shaft and rotate during the filtering process to the same extent as the filter fabric is transferred. It is particularly disadvantageous in this known filter, that the axial supply of the liquid to be filtered limits the liquid level, which must rise no higher than the lower edge of the hollow shaft. In addition, the inlet port cannot be adapted to different requirement, because it cannot have a random construction due to the hollow shaft design.

SUMMARY OF THE INVENTION

The problem of the invention is to so further develop a filter of the aforementioned type that the inlet port for the supply of the liquid to be filtered can be simply adapted as regards shape and position to different requirements. This problem is solved in accordance with the present invention. The filtering area is bounded by rings or washers, which are rigidly connected to the filter. The filter fabric guided along an arcuate path in the vicinity of the circumference of the rings engages on a rotatably mounted ring, which, in accordance with the transfer of the filter belt, rotates together with the latter. As a result the filter fabric is mounted on a concomitantly rotating element and can pass in unimpeded manner along the arcuate path, while a circular or rectangular inlet port can be constructed at virtually any random point in the vicinity of the wall inside the rigid rings. A flat or circular supply pipe or the like can be introduced through the inlet port and its outlet port can be positioned in such a way that a desired spacing with respect to the filter fabric is maintained.

The outer ring face of the rotatably mounted ring is preferably formed by an elastic sealing element, with which engages the opposite lateral edges of the filter cloth. A good sealing is obtained between the filter fabric and the wall of the filter in conjunction with an O-ring arranged between the bearing inner ring and the rotatably mounted ring. The O-ring can be inserted in an annular groove on the rotary ring or in an annular groove of the associated lateral disk. The O-ring can press radially against the rotary ring or axially against a lateral flange as the sealing element.

In a particularly advantageous manner the filter can use as a bearing element for the rotary rings in each case one arcuate ring segment. Preferably use is made of two ring halves with each of which engages a rotary ring. The ring half connected rigidly to the filter housing can be arranged in such a way that its two free ends widen upwards and the rotary ring is pressed from below against the outer circumferential face of the ring half. In order to achieve an adequate pressing action, a tension spring can be positioned on one of the guide pulleys of the lattice support belt, which forces upwards the latter and therefore the rotary rings engaging on the said belt. As a result of the use of two ring halves as bearing elements, the costs of such elements are halved compared with whole bearing rings.

In order to achieve a drying of the sludge remaining on the filter fabric, a moisture suction mechanism can be provided. The dried sludge can then be removed from the filter fabric by means of a scraper and introduced into a container, while the filter fabric freed from large residues can be wound onto a reel.

Advantageous further developments of the invention are shown hereinbelow.

BRIEF DESCRIPTION OF THE DRAWINGS

The invention is described in greater detail hereinafter relative to the drawings. FIG. 2 is a side view of the filter shown in FIG. 1. FIG. 3 is a plan view of the filter shown in FIG. 1. FIG. 4 is a cross-section in the vicinity of the rotatably mounted ring with a radial seal. FIG. 5 is a cross-section in the vicinity of the rotatably mounted ring with an axial seal.

DETAILED DESCRIPTION

Figure 1:
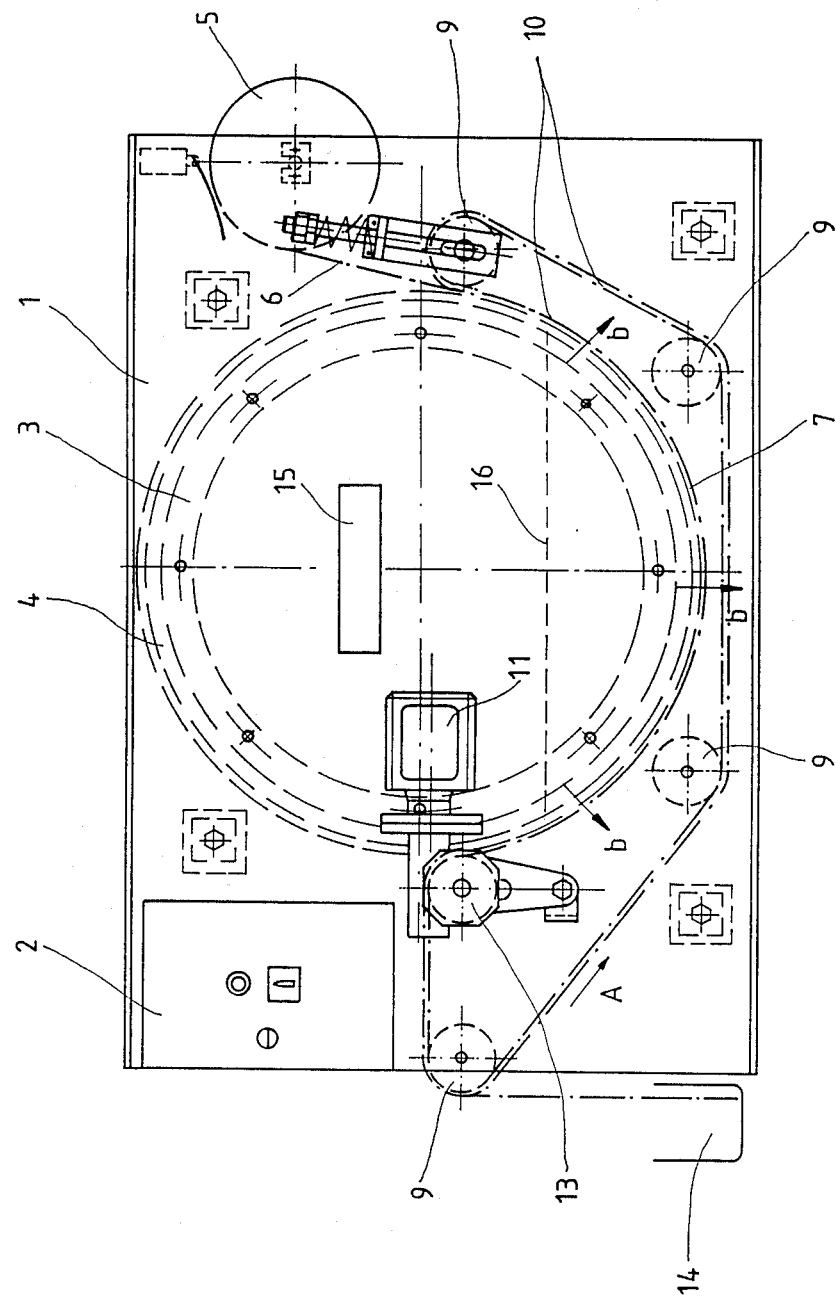
FIG. 1 is a front of the filter.

The filter shown in FIG. 1 has a housing 1, to which is fitted an eletrical control box 2. The means provided within the housing 1 are indicated by broken lines.

On the wall of housing 1 is provided a bearing inner ring 3, on which is externally arranged a rotatably mounted ring 4. The filter fabric 6 from a supply reel 5 is guided along an arcuate path 7 on ring 4 and is supported by a lattice support belt 10 running over guide pulleys 9. The lattice support belt 10 is driven by means of an electric motor 11 and a driving pulley 13. Thus, the lattice support belt 10 moves in the direction of arrow A, so that the filter fabric 6 and therefore also ring 4 are moved in like manner. The dirty filter fabric 6 passes into a container 14 shown in simplified form.

In the lateral disk or inner ring 3 is provided a rectangular inlet port 15, through which the liquid to be filtered is supplied by means of a not shown supply pipe or duct.

The filtered liquid passes out at the bottom of the filter fabric 6 guided along the arcuate path and in accordance with arrow direction b. The filtered liquid can be collected in a storage tank and drained off. The liquid to be filtered located in the filter during the filtering process can e.g. have the liquid level 16 shown in the drawings, but this level can also be much higher.

FIG. 2 shows in side view the electrical control box 2, electric motor 11, guide pulleys 9 and two lateral rings 4,17, which are rotatably mounted on corresponding lateral bearing inner rings 3,18.

FIG. 3 shows a filter in plan view. It is also possible to see the filter fabric reel 5, whose width is adapted to the spacing of rings 4 and 17.

FIG. 4 shows a cross-section in the vicinity of a rotatably mounted ring 17. The bearing inner ring 18 is mounted by means of screws 20 on wall 19, which is part of the filter housing. The outer ring face 21 of the rotatably mounted ring 17 is formed by an elastic sealing element 22, which is inserted in a groove 23 on ring 17.

In order to achieve a good seal between the bearing inner ring 18 and ring 17, an O-ring 24 is inserted in an annular groove 25. O-ring 24 can consist of a round cord.

Another construction of the seal is shown in FIG. 5, where the O-ring 24 is pressed axially against a side flange 26.

In place of wall 19 with the screwed on inner ring 18 or inner ring 3, it is also possible to use a rigidly positioned lateral disk, whose circumferential face forms the inner bearing face on which is rotatably mounted ring 17 or 4.

A vacuum can be produced below the filtering area by means of a pump, blower or compressor and this speeds up the filtering process.

The sealing element can be constituted by a cross-sectionally circular O-ring or cross-sectionally differing packing rings. Thus, a felt washer inserted in a groove can serve as the sealing element.

Figure 6:
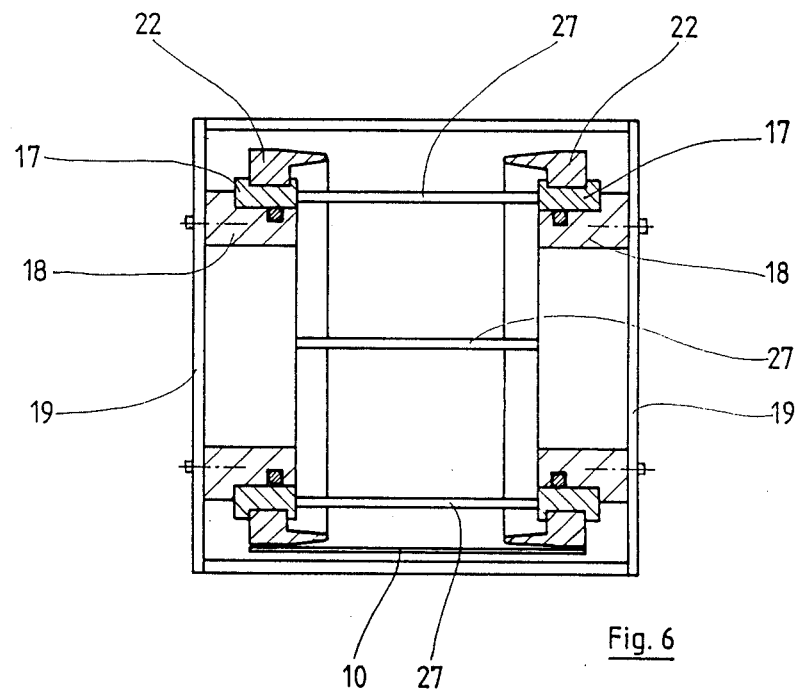
FIG. 6 shows the fundamental arrangement of the bearing rings and rotary rings in the filter.

FIG. 6 shows the basic arrangement of the bearing inner rings 18, which are screwed to walls 19, and the rotatably mounted rings 17, which are interconnected by means of several cross-ties 27.

Figure 7:
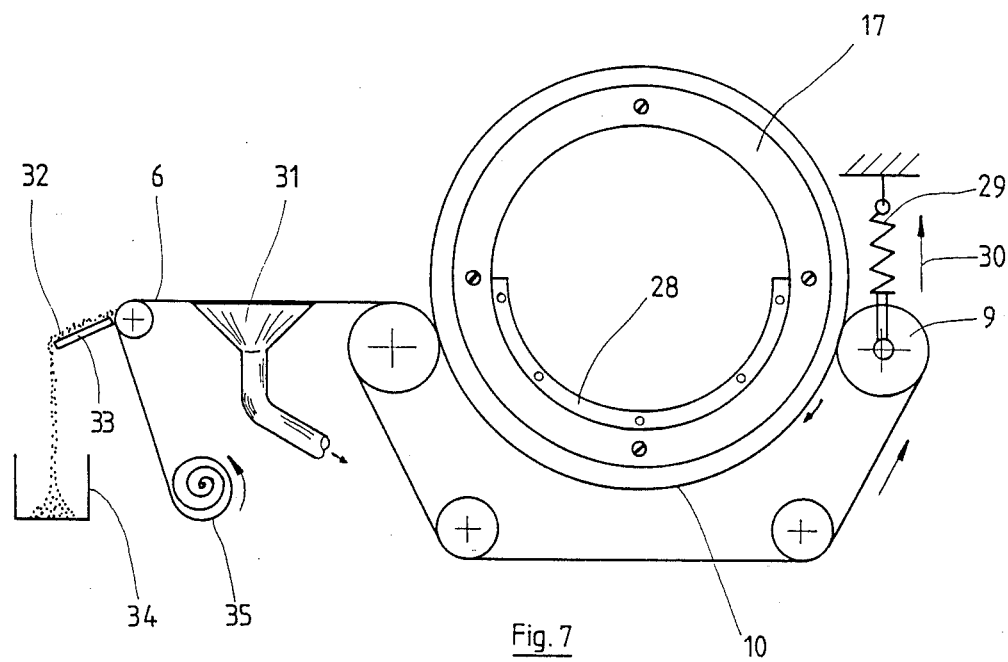
FIG. 7 is another embodiment in which ring halves are used as bearing elements for the rotary rings.

FIG. 7 shows view A according to FIG. 6, but the embodiment according to FIG. 7 differs from that of FIG. 6 in that in place of a bearing inner ring use is made of a ring half 28, against which the lattice support belt 10 presses the rotatahly mounted ring 17. For this purpose the lattice support belt 10 is fed over a guide pulley 9, which is drawn in the direction of arrow 30 by a tension spring 29. Tension spring 29 has such a high spring tension that the rotary ring 17 resting on either side of belt 10 are forced upwards against the associated ring halves 28.

A moisture suction mechanism 31 is positioned adjacent to the filtering region for drying the sludge and permits the removal from the filter fabric 6 of the dried sludge 32 by means of a scraper 33, whereby the sludge can then be supplied to a storage tank 34. The filter fabric 6 can be wound up to a reel 35 by means of a not shown electric motor. Sludge drying facilitates the disposal of the sludge and the used filter fabric.

I claim:

1. Filter for filtering liquids which comprises: a filtering region; a filter fabric guided along an arcuate path in said filtering region; a supply reel for supplying filter fabric to the filtering region; a housing including two walls laterally bounding the filtering region; a rotatably mounted outer ring on each of said walls having an outer ring face which arcuately engages the filter fabric; a bearing inner ring fitted to each wall and mounting the rotatably mounted outer ring; a support belt supporting the filter fabric against the outer ring; an inlet port in the upper half of said housing for supplying liquid to be filtered; and sealing means between the inner and outer rings; wherein said inner rings form bearing faces for said outer rings.

2. Filter according to claim 1 wherein the outer ring face is formed by an elastic sealing element.

3. Filter according to claim 1 including an O-ring forming a seal between the inner and outer rings.

4. Filter according to claim 3 including an annular groove in one of said inner and outer rings, wherein said O-ring is constructed as around cord inserted in said annular groove.

5. Filter according to claim 3 wherein said outer rings have an inner ring face and wherein the O-ring radially presses against the inner ring face of the rotatably mounted outer ring.

6. Filter according to claim 1 wherein said inlet port comprises a recess in one of said walls for supplying a liquid to be filtered.

7. Filter according to claim 6 wherein said recess is a rectangular inlet port in the upper half of one of said walls.

8. Filter according to claim 1 wherein the inner rings form rigidly positioned circumferential bearing faces for the rotatably mounted outer rings.

9. Filter according to claim 1 including means below the filtering region for producing vacuum therein.

10. Filter according to claim 1 including a moisture suction mechanism downstream from the filtering region for removing moisture from the filter fabric, a scraper downstream from the moisture suction mechanism for removing coarse residue from the filter fabric, and a reel downstream from the scraper for winding the filter fabric.

11. Filter for filtering liquids which comprises: a filtering region; a housing including two walls laterally bonding said filtering region; a filter fabric guided along an arcuate path in said filtering region; a rotatably mounted outer ring on each of said walls having an outer ring face which arcuately engages the filter fabric, said outer ring having a lateral flange; a bearing inner ring fitted to each wall and mounting the rotatably mounted outer ring; an annular groove in one of said inner and outer rings; and an O-ring forming a seal between the inner and outer rings inserted in said annular groove axially pressing against said lateral flange.

12. Filter for filtering liquids which comprises: filtering region; a housing including two walls laterally bounding said filtering region; a filter fabric guided along an arcuate path in said filtering region; a rotatably mounted outer ring on each of said walls having an outer ring face which arcuately engages the filter fabric; and a ring half rigidly arranged on the filter, wherein the rotatably mounted outer rings are mounted on said ring half.

13. Filter according to claim 12 wherein the ring half comprises a ring half whose ends are directed upwards and against which is pressed from below the associated outer ring.

14. Filter according to claim 13 including a lattice support belt engaging the outer ring, tensioning and pressing the outer ring against the ring half.

* * * * *